United States Patent [19]

Galuszka

[11] Patent Number: 5,450,867
[45] Date of Patent: Sep. 19, 1995

[54] HANDLING MECHANISM FOR WORKPIECE FASTENING PALLETS

[75] Inventor: Andrzej Galuszka, Perniö, Finland

[73] Assignee: AG Rozum Ltd. Oy, Pernio, Finland

[21] Appl. No.: 167,543

[22] Filed: Dec. 14, 1993

[30] Foreign Application Priority Data

Jan. 28, 1993 [FI] Finland .................. 930046

[51] Int. Cl.⁶ .............................................. B08B 3/02
[52] U.S. Cl. ........................... 134/66; 134/78; 134/133; 134/157
[58] Field of Search ............ 134/66, 78, 84, 133, 134/157, 137, 143, 149, 134, 160, 161

[56] References Cited

U.S. PATENT DOCUMENTS

| | | | |
|---|---|---|---|
| 1,166,849 | 1/1916 | Matthews | 134/157 |
| 1,207,283 | 12/1916 | Enghauser | 134/161 X |
| 2,530,333 | 11/1950 | Jost | 134/161 X |
| 2,535,111 | 12/1950 | Wishart | 134/78 |
| 2,565,246 | 8/1951 | Lehmkul | 134/76 |
| 3,227,166 | 1/1966 | Martz | 134/161 X |
| 3,910,297 | 10/1975 | Pinkham | 134/161 X |
| 4,314,524 | 2/1982 | Deguchi | 901/14 |
| 4,911,602 | 3/1990 | Doe | 134/134 X |

*Primary Examiner*—Frankie L. Stinson
*Attorney, Agent, or Firm*—Shenier & O'Connor

[57] ABSTRACT

A handling mechanism for workpiece fastening pallets (1), comprising fastening means (4') for fixing a pallet (1) to the handling mechanism and a wash basin (8) as well as a wash liquid circulating system (9-12). The fastening means (4') is a part of a rotary table (4) which is journalled to a turntable 3, having its horizontal turning axis (6) positioned such that a rotation axis (B—B) of said rotary table (4) can be pivoted from a vertical position to a horizontal position. In the latter position, the pallet (1) together with its workpieces (2) is located above the wash basin (8) and is rotatable around horizontal axis (B—B). The wash basin (8) is provided with an openable and closeable cover (16). Adjacent the wash basin (8) is positioned a robot (24) having a workhead (25) which is pivotable to a position above pallet (1) lying over the wash basin for burring said workpieces (2) and/or for replacing finished and washed workpieces (2) with others to be worked on.

2 Claims, 2 Drawing Sheets

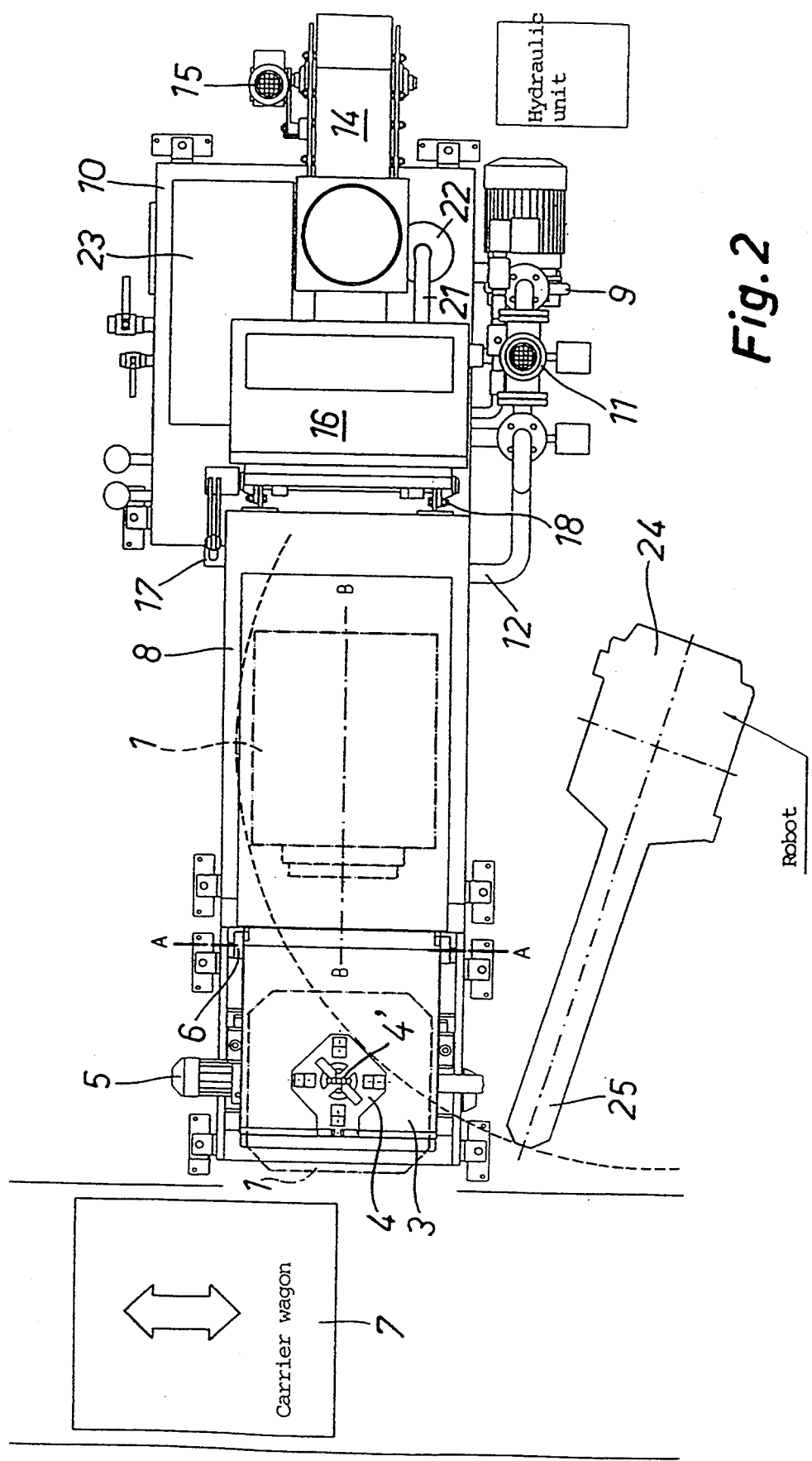

5,450,867

HANDLING MECHANISM FOR WORKPIECE FASTENING PALLETS

SUMMARY OF THE INVENTION

The present invention relates to a handling mechanism for workpiece fastening pallets, comprising fastening means for fixing a pallet to the handling mechanism and a wash basin as well as a wash liquid circulating system. In automatic or semi-automatic workpiece machining lines, the workpieces being handled are fastened to pallets. A quite large number of workpieces can be fastened to a single pallet, e.g. mounted on the four different sides thereof. Following the machining thereof, the workpieces mounted on the same pallets are transported by special carrier wagons to a burring device. After the burring, the pallets along with their workpieces are carried to a washing machine. After the washing, the pallets along with their workpieces are carried to an unloading and loading station, wherein the finished workpieces are dismounted from the pallet and fresh pieces to be worked on are brought onto the pallet.

An object of the invention is to provide a handling mechanism for workpiece fastening pallets, wherein the above workpiece handling operations (burring, washing and replacement of workpieces) can all be carried out in one place. Thus, the mechanical structure of a production line will be simplified, the demand for space is reduced, and the handling proceeds more quickly since the transfers of a pallet from one handling station to another will be avoided. This last-mentioned reason also reduces the spreading of contaminants in the environment.

The object and above-mentioned benefits of the invention are achieved on the basis of the characterizing features set forth in the annexed claim.

BRIEF DESCRIPTION OF THE DRAWINGS

One working example of the invention will now be described in more detail with reference made to the accompanying drawings, in which FIG. 1 shows a handling mechanism of the invention in a side view and FIG. 2 shows the same handling mechanism in a plan view.

DESCRIPTION OF THE PREFERRED EMBODIMENT

Figure 1:
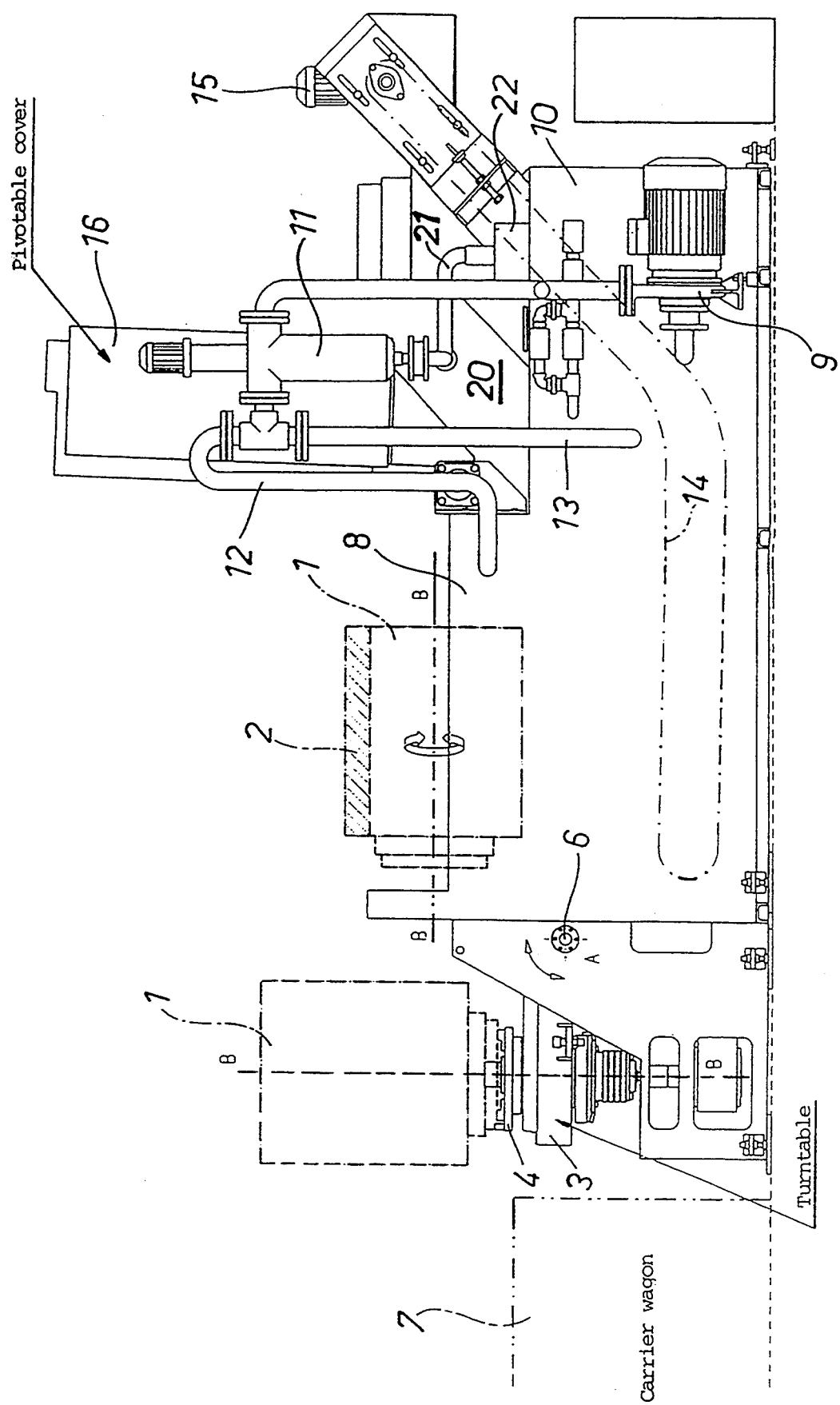

The workpieces machined in a working station (not shown) are fastened to pallets 1 and brought by carrier wagons 7 to a handling mechanism of the invention. A pallet 1 picked up from carrier wagon 7 is mounted on a table 4 rotatable around an axis B—B, said mounting being effected by fastening means 4' included in table 4 and movable by power units relative to axis B, whereby pallet 1 can be locked to table 4 in such a manner that the centre axis of pallet 1 coincides with rotation axis B—B of table 4.

Table 4 is journalled to a turntable 3 which is mounted on the body of the mechanism by means of bearings 6 for facilitating the turning of turntable 3 around a horizontal axis A—A in such a manner that the rotation axis B—B of table 4 can be pivoted from vertical position to horizontal position. The pivoting action can be effected by means of hydraulic cylinders, not shown.

After pivoting turntable 3 around axis A—A to set axis B—B in a horizontal position, the pallet 1 mounted on table 4 shall lie horizontally above a wash basin 8. The edge of wash basin 8 is provided with hinges 18 for connecting a cover 16 which is pivotable to a position closing said wash basin 8 or to an opened position shown in the figures.

Adjacent to wash basin 8 is positioned a robot 24 provided with a workhead 25 which, in view of burring said workpieces 2, can be turned to a position above a pallet 1 located over the wash basin. This can be done with cover 16 in an open position. A motor 5 is used for rotating table 4 through 90° at a time, such that pieces 2 to be worked on by workhead 25 will always be on the top surface of pallet 1. Thus, e.g. gravity can be exploited after a washing operation described hereinafter as said workhead 25 will be used for removing workpieces 2 from pallet 1 for replacing machined and washed workpieces 2 with fresh pieces to be worked on.

In order to carry out a washing operation, the mechanism includes a pump 9 for circulating wash liquid from a second basin 10 through a fine-mesh filter 11 into a pipe 12 for spraying the wash liquid therefrom onto the surfaces of pallet 1. At this time, said cover 16 is set in a closed position for eliminating the splashing of wash liquid. The contaminants like removed pieces of burr are dropped onto a conveyor 14 which is driven by a motor 15 for carrying solid contaminants away from wash liquid basins 8 and 10. Upon spraying the wash liquid, the level of basin 8 rises and the excess wash liquid flows over a weir into basin 10, the wash liquid passing through a coarse-mesh filter 23 on its way therein.

When it is not sprayed, the wash liquid can still be circulated by way of filter 11 into a bypass 13 which opens in basin 10. The particles collected in filter 11 are carried along with the bypass flow of wash liquid by way of a pipe 21 into a waste collecting bin 22 provided with a waste collecting bag, the wash liquid being capable of passing therethrough.

An essential feature of the invention is that the burring, washing and replacement operations can be performed on the pieces in one and the same place.

I claim:

1. A handling mechanism for a pallet having outer surfaces to which are secured a plurality of angularly displaced and previously machined workpieces including in combination means comprising a table incrementally rotatable through successive angles about a table axis for mounting the pallet, a wash basin, means mounting the table for rotation through 90 degrees about a first horizontal axis appreciably displaced from the table axis from a first position where the table axis is vertical and the pallet is remote the wash basin to a second position where the table axis is horizontal and the pallet overlies the wash basin with one workpiece uppermost, means for deburring said uppermost workpiece, and means comprising the wash basin for cleaning the deburred workpiece.

2. A handling mechanism as in claim 1 wherein the wash basin comprises a cover pivotable about a second horizontal axis between respective open and closed positions.

* * * * *